(12) United States Patent
McDermott

(10) Patent No.: US 10,119,654 B2
(45) Date of Patent: Nov. 6, 2018

(54) TRIPOD APPLIANCE

(71) Applicant: Kevin McDermott, Rockledge, FL (US)

(72) Inventor: Kevin McDermott, Rockledge, FL (US)

( * ) Notice: Subject to any disclaimer, the term of this patent is extended or adjusted under 35 U.S.C. 154(b) by 0 days.

(21) Appl. No.: 14/688,661

(22) Filed: Apr. 16, 2015

(65) Prior Publication Data
US 2016/0305603 A1    Oct. 20, 2016

(51) Int. Cl.
| | | |
|---|---|---|
| F16M 11/38 | (2006.01) | |
| F16M 11/24 | (2006.01) | |
| F16B 2/20 | (2006.01) | |
| F16B 2/22 | (2006.01) | |
| F21V 21/06 | (2006.01) | |
| F21V 17/00 | (2006.01) | |
| F21W 111/00 | (2006.01) | |

(52) U.S. Cl.
CPC .......... F16M 11/245 (2013.01); F16B 2/205 (2013.01); F16B 2/22 (2013.01); F16M 11/247 (2013.01); F21V 21/06 (2013.01); F16M 11/38 (2013.01); F21V 17/007 (2013.01); F21W 2111/00 (2013.01)

(58) Field of Classification Search
USPC ................................ 248/165, 166, 168, 170
See application file for complete search history.

(56) References Cited

U.S. PATENT DOCUMENTS

| | | | | |
|---|---|---|---|---|
| 1,444,569 | A * | 2/1923 | Starkweather | F16M 11/38 248/188 |
| 1,789,317 | A * | 1/1931 | McLeish | F16M 11/242 248/163.1 |
| 2,591,888 | A * | 4/1952 | Steffen | G08G 1/0955 248/170 |
| 2,634,075 | A * | 4/1953 | Mayzel | A47F 5/06 248/170 |
| 4,010,922 | A * | 3/1977 | Heller | A47C 4/02 248/165 |
| 4,905,946 | A * | 3/1990 | Wang | F16M 11/20 248/170 |
| 5,102,079 | A * | 4/1992 | Lee | F16M 11/16 248/166 |
| 5,310,145 | A * | 5/1994 | Chen | F21S 6/006 248/170 |
| 5,839,964 | A * | 11/1998 | Rudell | A63B 9/00 472/117 |
| 6,315,253 | B1 * | 11/2001 | Dicke | E01F 9/012 248/166 |

(Continued)

Primary Examiner — Alfred J Wujciak
(74) Attorney, Agent, or Firm — Hauptman Ham, LLP

(57) ABSTRACT

A tripod appliance has a device comprising a support with three hubs and three legs rotationally attached to the hubs permitting the legs to be rotated from a standing position to a storage position. Each hub has a support contour and each leg has a clip and a clip contour, each clip defining a standing position and a storage position. First and second rotations about the hub effect changes between standing and storage positions. Rotation from standing to storage positions is deterred by an interference of the clip contour interfering with the support contour. Each leg is configured so that a force applied to the leg at a distance from the hub overcomes the interference, thereby effecting rotational displacement.

10 Claims, 8 Drawing Sheets

(56) References Cited

U.S. PATENT DOCUMENTS

2003/0025272 A1* 2/2003 Billig ............... A63B 63/00
                                                              273/400
2008/0237939 A1* 10/2008 McDonnough ........ A45C 13/02
                                                              264/500

* cited by examiner

FIG 1
50
FIG 2
50
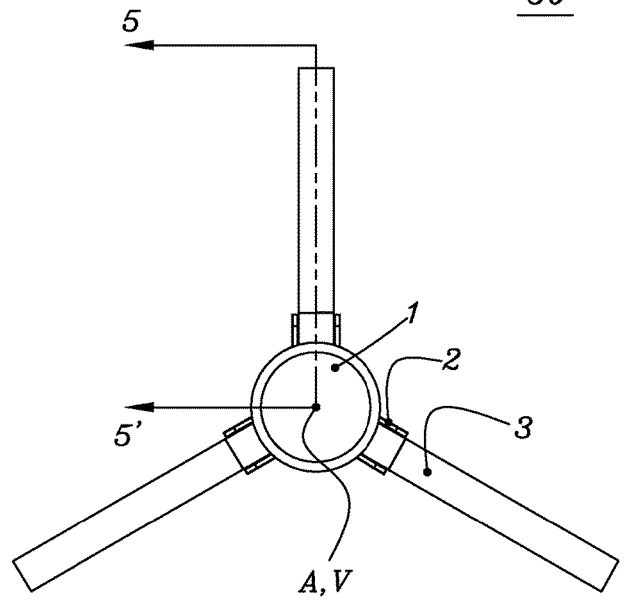
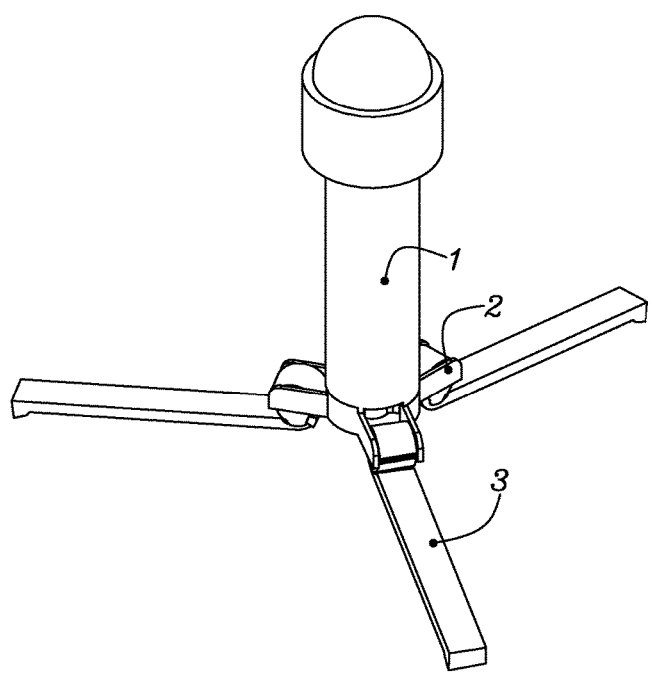

50

50

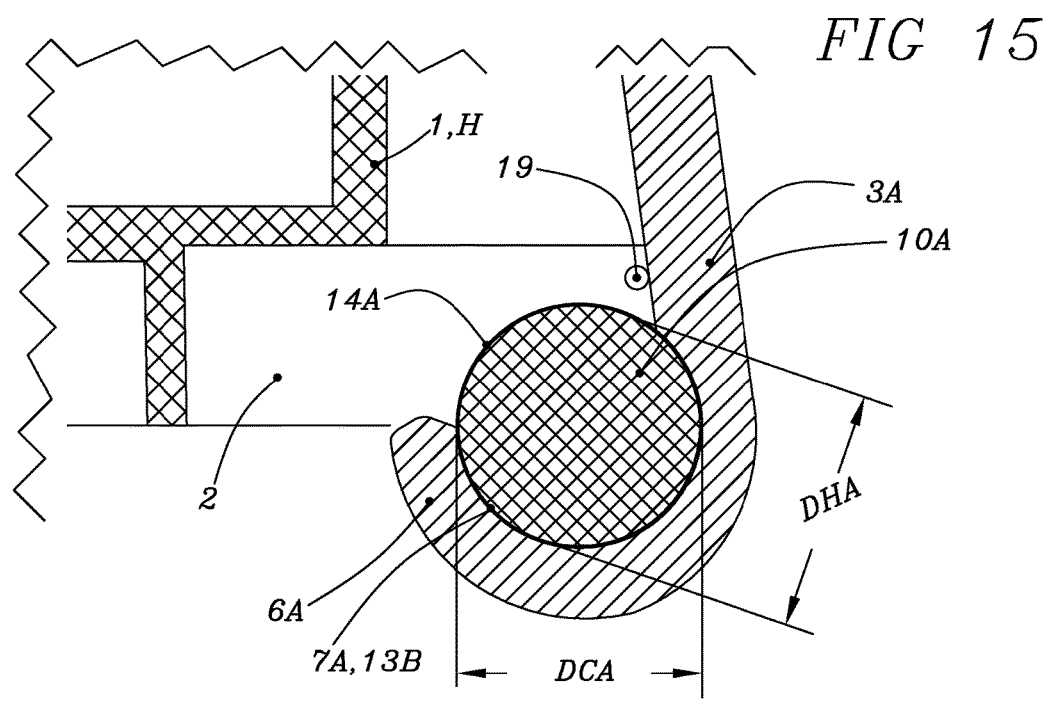

TRIPOD APPLIANCE

BACKGROUND

It is common for signal lights and many other devices to be held in a vertical standing position during their use and compacted when being stored. In order to achieve and stabilize the device in the vertical standing position a tripod is frequently employed. The typical tripod includes three legs which rotate towards the device to become substantially parallel to effect a compact storage position. The legs typically have a system to prevent them from inadvertently moving from the storage position. In addition the legs can typically be rotated away from the device to spread and provide a stable support for effecting a standing position. Finally the legs typically have a locking system to prevent them inadvertently moving from the standing position.

Tripods can employ several different methods to assure that the legs remain in the storage position or the standing position. The first method employs a clamp for each leg which is tightened by a screw/knob when the leg is in the storage or standing positions. If the leg is to be moved the screw/knob is loosened permitting the leg to be rotated. Upon reaching the alternate position the screw is tightened, thereby clamping the leg and preventing further movement.

Some designs configure the tripod such that the legs are connected, causing them to move as a group. In these configurations, a single screw/knob is used to simultaneously secure all of the legs when they are in the storage or standing positions.

Other designs employ a spring-loaded pin which intersects a leg to secure it in the storage or standing position. In these designs, an operator pulls on the pin to compress the spring such that it no longer intersects the leg, thereby permitting the leg to be rotated to an alternate position.

BRIEF DESCRIPTION OF THE DRAWINGS

Aspects of the present disclosure are best understood from the following detailed description when read with the accompanying Figs. It is noted that, in accordance with the standard practice in the industry, various features are not drawn to scale. In fact, the dimensions of the various features may be arbitrarily increased or reduced for clarity of discussion.

FIG. 1 is a top view of tripod appliance 50 with its legs in their standing positions according to some embodiments.

FIG. 2 is a perspective view of tripod appliance 50 with its legs in their standing positions according to some embodiments.

FIG. 15 is a view of tripod appliance 50 similar to FIG. 11 except FIG. 15 employs alternate clip and hub contours according to some embodiments.

DETAILED DESCRIPTION OF THE DRAWINGS

Figure 3:
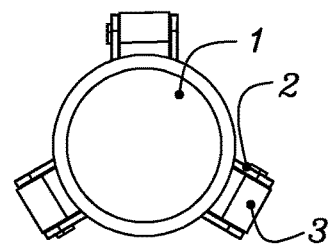
FIG. 3 is a top view of tripod appliance 50 with its legs in their stored positions according to some embodiments.

The following disclosure provides many different embodiments, or examples, for implementing different features of the disclosure. Specific examples of components and arrangements are described below to simplify the present disclosure. These are, of course, examples and are not intended to be limiting. The present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the Figs. The spatially relative terms are intended to encompass different orientations of the device in use or operation in addition to the orientation depicted in the Figs. The apparatus may be otherwise oriented (rotated 90 degrees or at other orientations) and the spatially relative descriptors used herein may likewise be interpreted accordingly.

Figure 4:
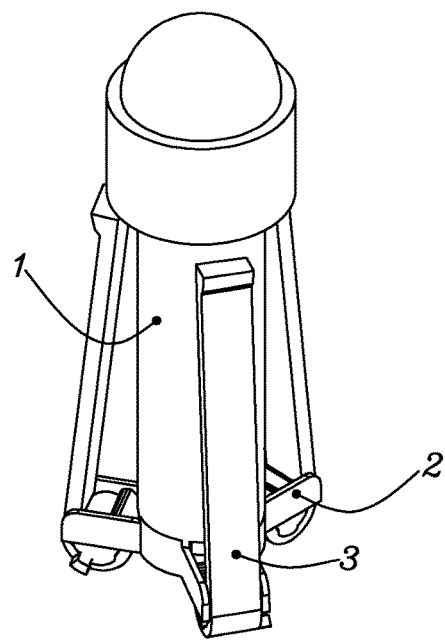
FIG. 4 is a perspective view of tripod appliance 50 with its legs in their stored positions according to some embodiments.

FIGS. 1 and 2 are top and perspective views, respectively, of tripod appliance 50 with its three legs in their standing positions according to some embodiments. According to some embodiments, FIGS. 3 and 4 are top and perspective views, respectively, of tripod appliance 50 with its three legs in their stored positions. Looking at FIGS. 1 through 4, tripod appliance 50 includes three legs represented by leg 3 rotationally attached to support 2 which is part of device 1. According to some embodiments, device 1 is a signal light which is held with its axis A coincident with vertical V when tripod appliance 50 is in its standing position with each of its three legs in their standing positions. According to some embodiments, tripod appliance 50 is compacted for transportation or storage when each of its three legs is in its storage position. According to some embodiments, leg 3 requires a 120° rotational displacement to move from the standing position to the storage position. According to some embodiments, this rotational displacement has an angle in the range of 80° to 140°. According to some embodiments, another device such as a fan is substituted for the signal light device 1 of tripod appliance 50.

Figure 5:
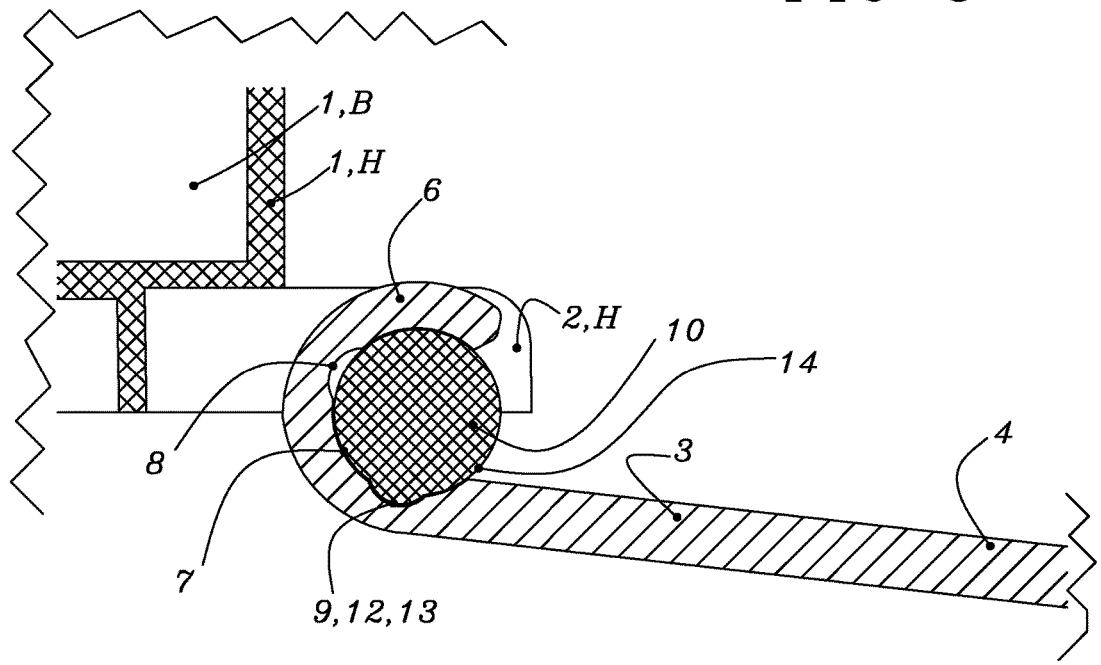
FIG. 5 is a cross-sectional view taken across 55' of FIG. 1 according to some embodiments.

FIG. 5 is a cross-sectional view taken across 55' of FIG. 1, according to some embodiments. In FIG. 5, leg 3 is representative of all three legs, in some embodiments.

Figure 6:
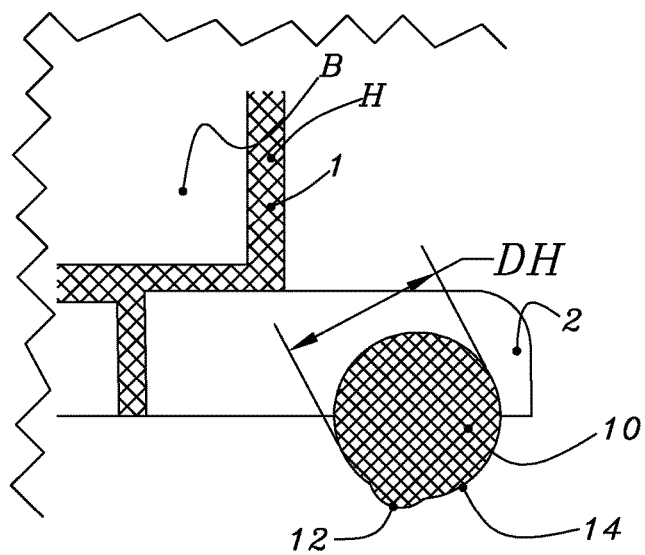
FIG. 6 is a view of tripod appliance 50 of FIG. 5 with its leg removed according to some embodiments.

According to some embodiments, FIG. 6 is a view similar to FIG. 5 of tripod appliance 50 with leg 3 removed. According to some embodiments, FIG. 7 is a view of leg 3 removed from FIG. 5.

Figure 7:
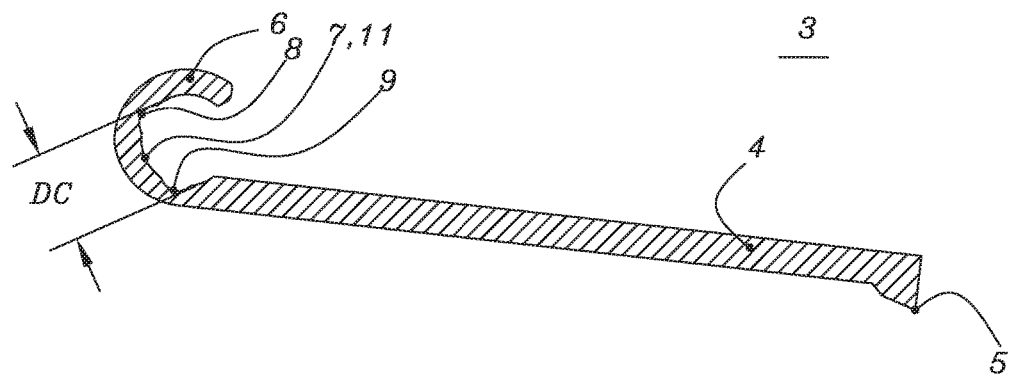
FIG. 7 is a view of the leg removed from FIG. 5 according to some embodiments.

According to some embodiments, looking at FIGS. 5 through 7, and starting with FIG. 7, leg 3 includes clip 6 and arm 4. In some embodiments, arm 4 extends a distance of approximately 4 inches from clip 6. In some embodiments, leg 3 also includes tip 5. According to some embodiments, tip 5 is configured to dig into the ground and deter sliding of the tripod appliance 50. Clip 6 also includes interior concave contour 7 having storage depression 8, standing depression 9 and plateau 11 on clip diameter DC. FIG. 6 details one of three hubs which according to some embodiments are integral parts of support 2. According to some embodiments, FIGS. 5 thru 7 includes device 1 which comprises support 2.

According to some embodiments, support 2 includes three hubs which are molded appendages typified by hub 10. Hub 10 comprises convex hub contour 14 which includes projection 12 on hub diameter DH. According to some embodiments, convex hub contour 14 is an integral molded part of support 2 and therefore is also considered a support contour of support 2. According to some embodiments, clip diameter DC and hub diameter DH are approximately equal forming a sliding fit. According to some embodiments to be later described, depending upon the rotational relationship between leg 3 and clip 6, selected portions of concave contour 7 of clip 6 are configured to interact with selected portions of convex hub contour 14 of hub 10 to maintain and select the storage and the standing positions of leg 3.

Support 2 is, according to some embodiments, an integral part of device 1 and is molded as an integral extension of device 1. Alternatively, support 2 according to some embodiments, is a separate component attached to device 1. According to some embodiments, device 1 is a signal light having battery compartment B within tubular housing H integrally molded with support 2.

Referring back to FIG. 5, leg 3 is in its standing position with projection 12 seated within standing depression 9 and concave clip contour 7 conforming to convex hub contour 14 such that clip 6 is not deformed. According to some embodiments, in operation, the FIG. 5 standing position of leg 3 is maintained because a rotational displacement of leg 3 about hub 10 is deterred due to interference 13, a result of the fact that projection 12 cannot rotate without pushing against standing depression 9 of clip 6. According to some embodiments, in operation, interference 13 between projection 12 and standing depression 9 of clip 6 must be overcome by a rotational moment applied to leg 3 by a force to be later described before leg 3 can experience a rotational displacement.

According to some embodiments, tripod appliance 50, including its legs, is molded of an engineering grade plastic resin such as polycarbonate or a compound thereof which is resilient, permitting one or more components of tripod alliance 50 to be capable of being temporarily distorted by the configuration of tripod appliance 50 and of springing back to their original contours when permitted to do so by the configuration of tripod appliance 50. Because components of plastic resins can be permanently distorted if they are distorted in any of the positions at which they are left for extended periods of time, components of tripod appliance 50 could be permanently distorted in either the standing position or the storage position if they were distorted beyond an acceptable elongation when in either of these positions and remained in either of these positions for extended periods of time. A permanent distortion could cause tripod appliance 50 to fail to perform as required. Looking back at FIG. 5, it can be seen that, according to some embodiments, in the standing position (mode) of tripod alliance 50, concave clip contour 7 conforms to convex hub contour 14 such that neither is distorted and neither is subject to permanent distortion.

Figure 8:
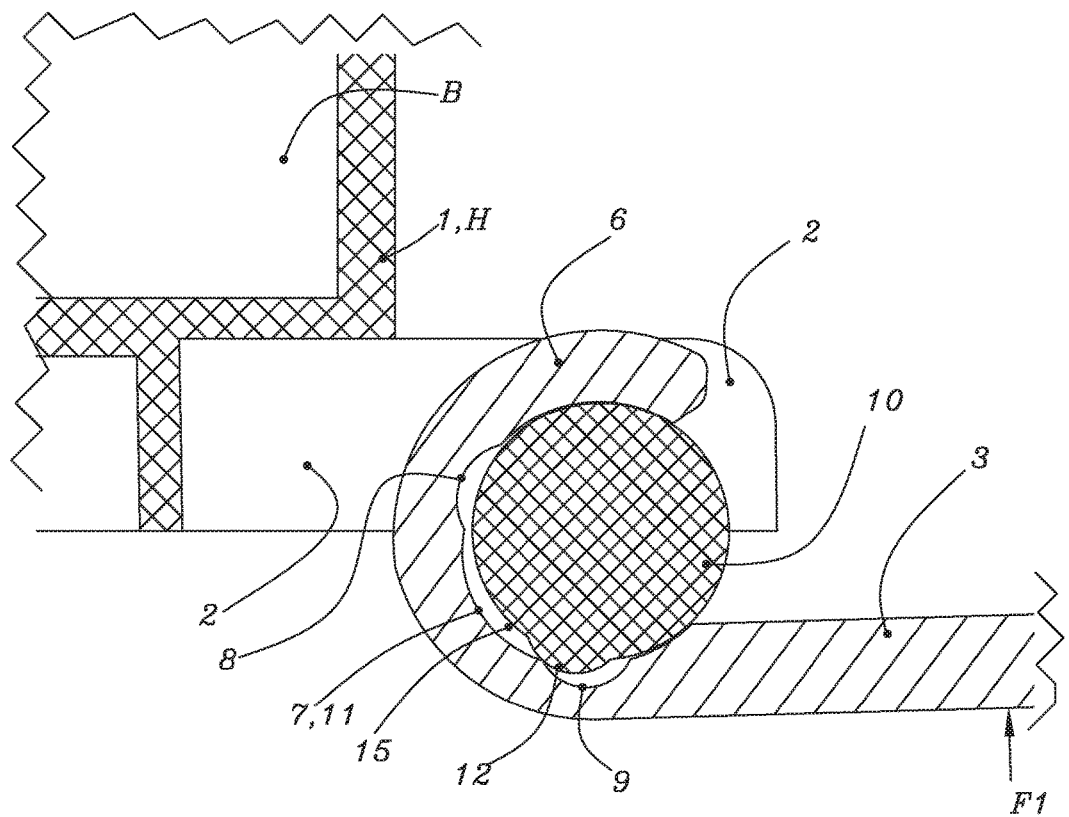
FIG. 8 is a view of tripod appliance 50 of FIG. 5 with its leg slightly displaced from its standing position according to some embodiments.

FIG. 8 is similar to FIG. 5 except that, in operation, force F1 is applied near tip 5 of leg 3 substantially perpendicular to arm 4 causing a rotational moment urging clip 6 of leg 3 to overcome the interference caused by projection 12 in standing depression 9. In operation, force F1 encourages leg 3 to rotate about hub 10 such that standing depression 9 moves away from and out of projection 12. FIG. 8 shows a small rotational displacement of leg 3 with projection 12 leaving standing depression 9 at plateau 11 of concave clip contour 7 such that projection 12, in operation, distorts clip 6, causing first gap 15, representing a distortion of clip 6. In operation, clip 6, in being distorted, represents a resilient change in concave clip contour 7, which acts like a spring such that, if force F1 was removed, clip 6 would return to its original contour and projection 12 would be pushed back into standing depression 9. Furthermore, in operation, when leg 3 is moved from the storage position to the standing position—to be later discussed—the operator does not have to precisely position leg 3 in the standing position because, once leg 3 is rotationally displaced to the position shown in FIG. 8, it—due to the resilient spring action of clip 6—continues to rotate and automatically snaps into the standing position as shown in FIG. 5.

Figure 9:
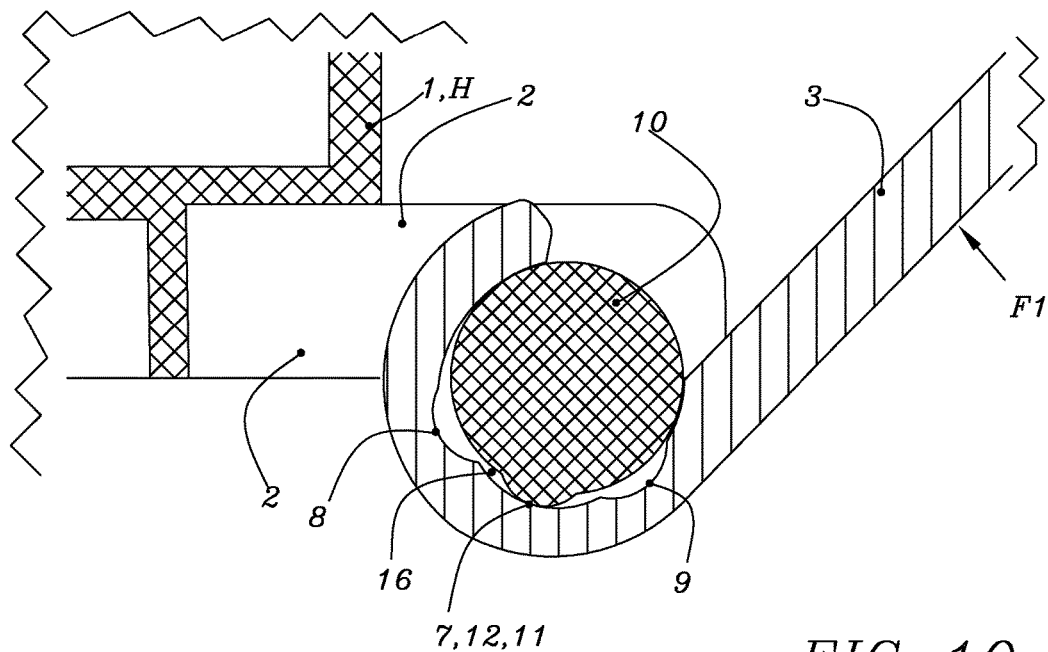
FIG. 9 is a view of tripod appliance 50 of FIG. 5 with its leg positioned between its storage position and its standing position according to some embodiments.

According to some embodiments, FIG. 9 shows the rotational displacement of leg 3 beyond the displacement shown in FIG. 8 that results if force F1 is continued to be applied about leg 3, in operation. The FIG. 9 rotational displacement of leg 3 places projection 12 at plateau 11, creating second gap 16 between hub 10 and clip 6. In operation, first gap 15 changes to second gap 16 as clip 6 is rotated about hub 10. This displacement represents a second distortion of clip 6. In fact, in operation, the gap continuously changes shape as clip 6 is rotated about hub 10. The gap is noted to identify the fact that clip 6 is being distorted and because of its resiliency—when permitted by the configuration of tripod appliance 50—returns to its original undistorted contour and, in doing so, eliminates the gap.

According to some embodiments, leaving projection 12 at plateau 11 as shown in FIG. 9 for a length of time would result in a permanent distortion of clip 6, resulting in diminished operation of tripod appliance 50. According to some embodiments, the plastic resin selected for tripod appliance 50 has sufficient elasticity such that it does not experience permanent deformation regardless of the position of leg 3. According to some embodiments, the plastic resin includes fillers such as glass in order to provide the combination of strength, elasticity and coefficient of friction necessary for tripod appliance 50 to function as described herein.

According to some embodiments, when projection 12 is at plateau 11 clip 6 experiences its maximum distortion. According to some embodiments, in order to prevent leg 3 being left in the FIG. 9 position in order to reduce the possibility of permanent deformation of leg 3, concave clip contour 7 is configured to minimize or even eliminate plateau 11 such that the resilient change in the contour of clip 6 forces leg 3 into either its standing position or its storage position. According to some embodiments, tripod appliance 50 comprises dimensions and contours such that the deformation of clip 6 when projection 12 is at plateau 11 does not exceed the elastic limits of the selected resin in order to prevent leg 3 from being permanently deformed as it is rotated, in operation, from the standing position to the storage position. According to some embodiments, resins are employed with the contours of tripod appliance 50 such that its components are not permanently distorted either in the standing position, storage position, or during the rotation between positions.

Figure 10:
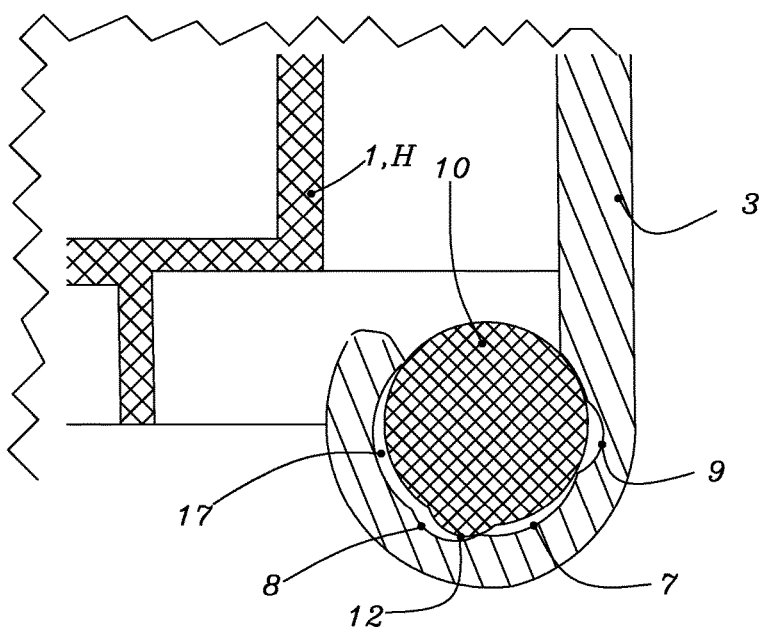
FIG. 10 is a view of tripod appliance 50 of FIG. 5 with its leg slightly displaced from its storage position according to some embodiments.

According to some embodiments, FIG. 10 shows a rotational displacement of leg 3 beyond the displacement shown in FIG. 9 that results if force F1 is continued to be applied about leg 3, in operation. The FIG. 10 rotational displacement of leg 3 places projection 12 partially within storage depression 8, creating third gap 17 between hub 10 and clip 6. Third gap 17 represents a distortion of clip 6. According to some embodiments, in operation, clip 6, in being distorted, effects a resilient change in concave clip contour 7 which acts like a spring having elastic potential energy such that, upon removal of force F1, clip 6 seeks to return to its original contour, effecting forces which force projection into storage depression 8, accurately positioning leg 3 in its storage position. According to some embodiments, in operation, a person rotating leg 3 from the standing position to the storage position does not have to precisely position the leg in the storage position because once the leg is rotationally displaced to the position shown in FIG. 10, it—due to the resilient spring action of clip 6—continues to rotate and automatically snaps into its storage position as shown in FIG. 11.

Figure 11:
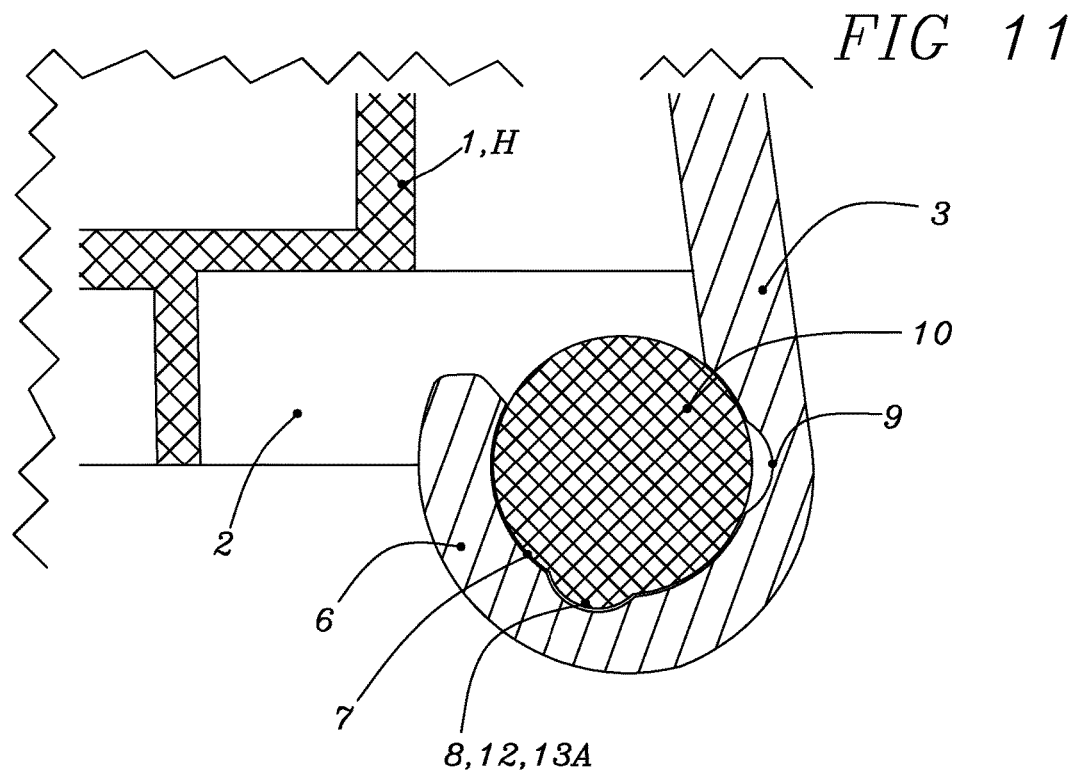
FIG. 11 is a view of tripod appliance 50 of FIG. 5 with its leg in its storage position according to some embodiments.

FIG. 11 is a view of tripod appliance 50 of FIG. 5, according to some embodiments, with protrusion 12 of hub 10 in storage depression 8 of leg 3 effecting leg 3 in its storage position. In operation, rotating leg 3 from its storage position is deterred by interference 13A, which results from protrusion 12 being seated in storage depression 8. Interference 13A, in operation, deters a rotational displacement of leg 3 and requires a rotational moment of leg 3 about hub 10 in order to move leg 3 from its storage position to its standing position. According to some embodiments, a rotational moment is created by a force applied perpendicular to leg 3 at a distance from clip 6.

Figure 12:
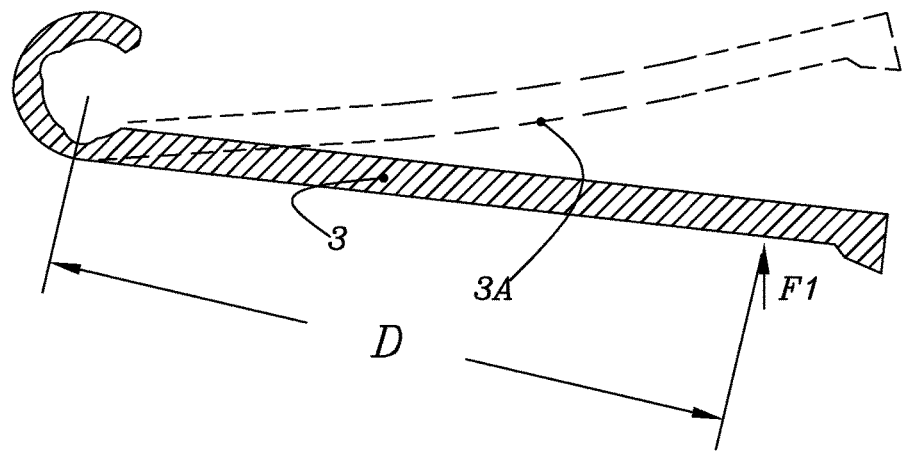
FIG. 12 is a view of leg 3 of FIG. 5 showing its deformation resulting from a force directed to effect a displacement from a standing to a storage position according to some embodiments.

FIG. 12 is a view of leg 3 removed from FIG. 5 showing the deformation resulting from first force F1 directed perpendicular to leg 3 to effect a rotational displacement from a standing to a storage position according to some embodiments. First force F1 is applied perpendicular to leg 3 at a distance D from the center of hub 10, around which leg 3 rotates, thereby creating a rotational moment with magnitude F1×D. In some embodiments, first force F1 ranges from 1 ounce to 16 ounces. In some embodiments, distance D ranges from 1 inch to 8 inches. In some embodiments, a rotational movement ranges from 80° to 140°.

Due to its resiliency, arm 4 of leg 3 distorts (bends) forming contour 3A which stores spring energy. In operation, this stored energy is released to encourage a continuing rotation of leg 3 when the force applied to leg 3 overcomes interference 13 employed to deter a rotational displacement from the standing position to the storage position.

Figure 13:
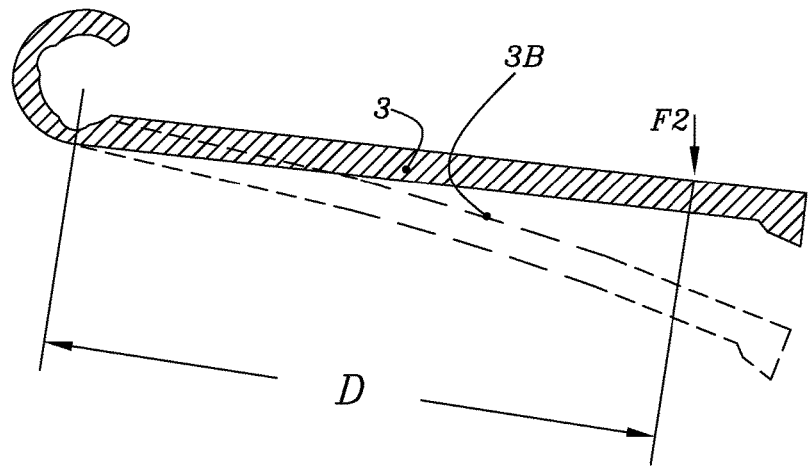
FIG. 13 is a view of leg 3 of FIG. 5 showing its deformation resulting from a force directed to effect a displacement from a storage to a standing position according to some embodiments.

FIG. 13 is a view of leg 3 of FIG. 5 showing the deformation resulting from second force F2 directed perpendicular to leg 3 to effect a displacement from a storage to a standing position, according to some embodiments. Second force F2 is applied perpendicular to leg 3 at a distance D from the center of hub 10, around which leg 3 rotates, thereby creating a rotational moment with magnitude F2×D. In some embodiments, second force F2 ranges from 1 ounce to 16 ounces. In some embodiments, distance D ranges from 1 inch to 8 inches. In some embodiments, a rotational movement ranges from 80° to 140°.

Due to its resiliency, arm 4 of leg 3 distorts (bends) forming contour 3B which stores spring energy. In operation, this stored energy is released to encourage a continuing rotation of leg 3 when the force applied to leg 3 overcomes interference 13A employed to deter a rotational displacement from the storage position to the standing position.

Referring back to FIGS. 1 and 2, with tripod alliance 50 in its standing position, device 1 due to its weight creates downward forces which encourage the rotational displacement of leg 3 to move leg 3 from its standing to its storage position. According to some embodiments, interference 13 must be sufficiently large to stop the rotation of leg 3 at the same time it must be limited such that leg 3 is not damaged or permanently deformed in overcoming interference 13.

Figure 14:
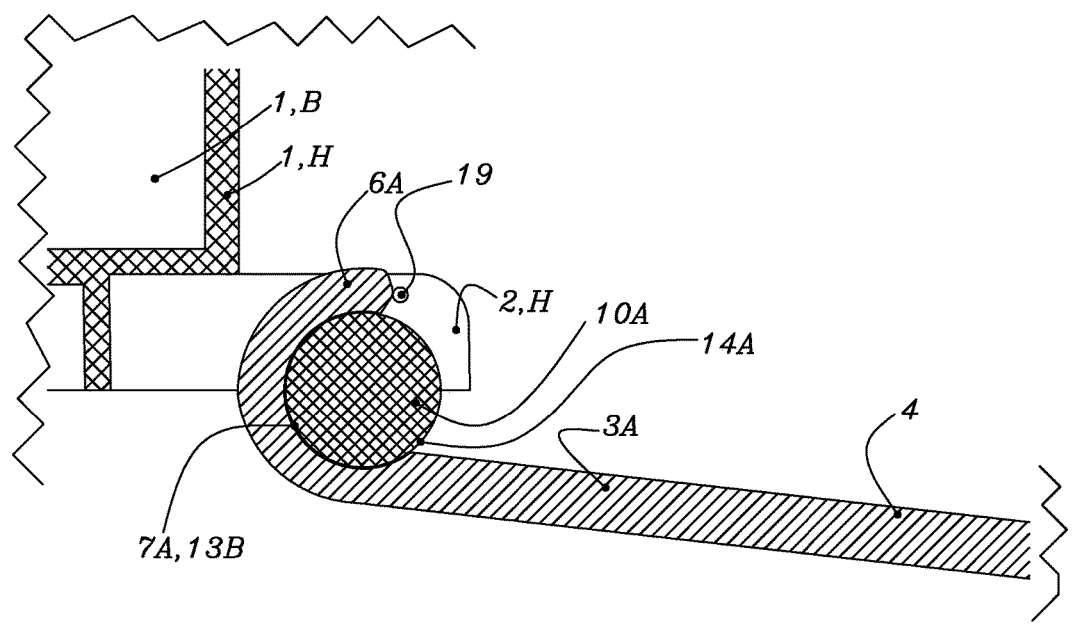
FIG. 14 is a view of tripod appliance 50 similar to FIG. 5 except FIG. 14 employs alternate clip and hub contours according to some embodiments.

According to some embodiments, an interference to deter a rotational displacement of leg 3 between the storage and standing positions is achieved by having a frictional interference between the inside diameter of clip 6 and the outside diameter of hub 10. According to some embodiments, FIGS. 14 and 15 are similar to FIGS. 5 and 11, respectively, except concave clip contour 7 has been replaced with alternate concave clip contour 7A having alternate clip diameter DCA and convex hub contour 14 replaced with alternate convex hub contour 14A having alternate hub diameter DHA. Alternate clip diameter DCA is smaller than alternate hub diameter DHA such that when alternate clip 6A is snapped or clamped over alternate hub 10A it is deformed, thereby creating a pressure against hub 10A. This pressure, along with the static coefficient of friction of the resin employed to construct tripod appliance 50, effects alternate interference 13B which deters a rotational displacement of alternate leg 3A about alternate hub 10A. Therefore, in operation, alternate interference 13B deters a rotational displacement of alternate leg 3A when moving from the standing position to the storage position or when moving from the storage position to the standing position. In operation, upon application of a force upon alternate leg 3A at a distance from hub 10A, arm 4 of alternate leg 3A distorts (see FIGS. 12 and 13), storing spring energy. Upon continued application of the force, alternate leg 3A rotates about alternate hub 10A, changing the relationship from static to moving friction. The moving coefficient of friction is less than the static coefficient of friction such that alternate leg 3A rotates more freely about alternate hub 10A. According to some embodiments, in operation, the reduced coefficient of friction permits this stored energy to be released to encourage the continued rotation of alternate leg 3A. Projection 19, which is a rod shaped projection of support 2, is configured to act as a stop for positioning alternate leg 3A at either its standing position or its storage position.

According to some embodiments, FIGS. 1 through 13 employ the contour of clip 6 of leg 3 to interact with the contour of hub 10 of support 2 to effect an interference for deterring a rotational displacement of leg 3 between its storage and standing positions. According to some embodiments, the objective of effecting an interference for creating a deterrent against a rotational displacement of leg 3 about hub 10 is achieved by configuring support 2 or hub 10 such that a deformation of the contour of support 2 or hub 10 is required before leg 3 can be rotated.

Referring back to FIG. 5, concave clip contour 7 includes depressions and convex hub contour 14 includes projection 12 in order to create interference 13. According to some embodiments, concave clip contour 7 and convex hub contour 14 have other configurations that similarly interact to create an acceptable interference.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed:

1. A tripod appliance comprising:
   a supporting for holding a device and comprising three hubs defining a center axis of the tripod appliance, wherein the hubs extend in a horizontal direction perpendicular to the center axis, and each of the hubs corresponding to a leg and having an attachment to the leg,
   the leg having
      a clip, and
      an arm with the clip at a first end of the arm, and a second end of the arm extending an arm distance from the clip, and
   the attachment comprising a rotational attachment of the clip to the hub and effecting a standing position and a storage position of the leg about the support,
   wherein
      a change from the standing position to the storage position is effected by a first direction rotational displacement of the leg about the hub,
      the first direction rotational displacement is deterred by a first interference for maintaining the leg in the standing position, the first interference comprising a contour of the leg engaging a contour of the hub,
      a first force applied to the arm at a first selected distance from the clip and perpendicular to the arm creates a first direction rotational moment of the leg about the hub, overcomes the first interference, effects the first direction rotational displacement and rotates the leg from the standing position to the storage position,
      the hub has a depression and the clip has a projection, and
      the projection is configured to engage the depression in the standing and storage positions, and the center axis of tripod appliance is substantially perpendicular to a rotational axis of the first direction rotational displacement.

2. The tripod appliance according to claim 1, wherein
   the leg is molded of a resilient plastic, and
   the clip comprises a contour configured to distort and act like a spring as the leg is rotated to the storage position, whereby due to a resilient spring action of the clip, the leg continues to rotate and automatically snaps into the storage position as the leg approaches the storage position.

3. The tripod appliance according to claim 1, wherein
   the support is molded of a resilient plastic and the leg is molded of a resilient plastic,
   the hub comprises a convex contour and the clip comprises a concave contour,
   the clip is resiliently positioned around the hub, and
   the first interference is effected by a static coefficient of friction between the clip and the hub.

4. The tripod appliance according to claim 1, wherein
   the device is a signal light having a battery compartment within a tubular housing attached to the support and held with an axis of the device in a vertical position when each of the legs are in the standing position.

5. The tripod appliance according to claim 1, wherein
   the support is molded of a resilient plastic and the leg is molded of a resilient plastic, and
   the first force upon overcoming the first interference effects a distortion in at least one of the contour of the clip or the contour of the hub, and
   at least one of the contour of the clip or the contour of the hub returns to the original undistorted contour upon the leg being at, at least one, of the storage position or the standing position.

6. The tripod appliance according to claim 1, wherein
   a change from the storage position to the standing position is effected by a second direction rotational displacement of the leg about the hub,
   the second direction rotational displacement is deterred by a second interference for maintaining the leg in the storage position, the second interference comprises the contour of the leg engaging the contour of the hub, and
   a second force applied to the arm at a second selected distance from the clip, perpendicular to the arm and opposite in direction to the first selected force effects a second direction rotational moment of the leg about the hub, whereby the second force upon overcoming the second interference effects the second rotational displacement thereby moving the leg from the storage position to the standing position.

7. A tripod appliance comprising:
   a support for holding a device and comprising three of a hub, and each of the hubs corresponding to a leg and having an attachment to the leg,
   the leg having a clip and an arm with the clip at a first end of the arm, and a second end of the arm extending an arm distance from the clip, and
   the attachment comprising a rotational attachment of the clip to the hub and effecting a standing position and a storage position of the leg about the support,
   wherein
      a change from the standing position to the storage position is effected by a first direction rotational displacement of the leg about the hub,
      the first direction rotational displacement is deterred by a first interference for maintaining the leg in the standing position, the first interference comprising a contour of the leg engaging a contour of the hub,
      a first force applied to the arm at a first selected distance from the clip and perpendicular to the arm creates a first direction rotational moment of the leg about the hub, overcomes the first interference, effects the first direction rotational displacement and rotates the leg from the standing position to the storage position,
      the support is molded of a resilient plastic and the leg is molded of a resilient plastic,
      the hub comprises a convex contour and the clip comprises a concave contour,
      the contour of the clip and the contour of the hub are configured for the clip being snapped over the hub, and
      the clip is capable of rotating about the hub.

8. A tripod appliance comprising:
   a support for holding a device and comprising three of a hub, and each of the hubs corresponding to a leg and having an attachment to the leg,
   the leg having a clip and an arm with the clip at a first end of the arm, and a second end of the arm extending an arm distance from the clip, and the attachment comprising a rotational attachment of the clip to the hub and effecting a standing position and a storage position of the leg about the support, wherein a change from the standing position to the storage position is effected by a first direction rotational displacement of the leg about the hub, the first direction rotational displacement is deterred by a first interference for maintaining the leg in the standing position, the first interference comprising a contour of the leg engaging a contour of the hub, a first force applied to the arm at a first selected distance from the clip and perpendicular to the arm creates a first direction rotational moment of the leg about the hub, overcomes the first interference, effects the first direction rotational displacement and rotates the leg from the standing position to the storage position, the leg is of a resilient plastic and the arm is configured to act like a spring, whereby the first force due to the first interference initially causes the arm to bend effecting a stored energy in the arm, and the first force in overcoming the first interference releases the stored energy to encourage the first direction rotational displacement of the leg.

9. A tripod appliance comprising:

a support for holding a device and comprising three of a hub, and each of the hubs corresponding to a leg and having an attachment to the leg, the leg having a clip and an arm with the clip at a first end of the arm, and a second end of the arm extending an arm distance from the clip, and the attachment comprising a rotational attachment of the clip to the hub and effecting a standing position and a storage position of the leg about the support, wherein a change from the standing position to the storage position is effected by a first direction rotational displacement of the leg about the hub, the first direction rotational displacement is deterred by a first interference for maintaining the leg in the standing position, the first interference comprising a contour of the leg engaging a contour of the hub, a first force applied to the arm at a first selected distance from the clip and perpendicular to the arm creates a first direction rotational moment of the leg about the hub, overcomes the first interference, effects the first direction rotational displacement and rotates the leg from the standing position to the storage position, the leg is molded of a resilient plastic, and the clip comprises a contour configured to distort and act like a spring as the leg is rotated to the storage position, whereby due to a resilient spring action of the clip the leg continues to rotate and automatically snaps into the storage position as the leg approaches the storage position.

10. A tripod appliance comprising:

a support for holding a device and comprising three of a hub, and each of the hubs corresponding to a leg and having an attachment to the leg, the leg having a clip and an arm with the clip at a first end of the arm, and a second end of the arm extending an arm distance from the clip, and the attachment comprising a rotational attachment of the clip to the hub and effecting a standing position and a storage position of the leg about the support, wherein a change from the standing position to the storage position is effected by a first direction rotational displacement of the leg about the hub, the first direction rotational displacement is deterred by a first interference for maintaining the leg in the standing position, the first interference comprising a contour of the leg engaging a contour of the hub, a first force applied to the arm at a first selected distance from the clip and perpendicular to the arm creates a first direction rotational moment of the leg about the hub, overcomes the first interference, effects the first direction rotational displacement and rotates the leg from the standing position to the storage position, a contour of the clip comprises a concave interior contour having at least one of a projection or a depression, and the concave contour is configured to deform and act like a spring by storing then releasing potential energy during the first rotational displacement.

* * * * *